United States Patent [19]

Davies et al.

[11] Patent Number: 4,602,954
[45] Date of Patent: Jul. 29, 1986

[54] METAL STRIP

[75] Inventors: Idwal Davies, Mold; John Bellis, Wrexham, both of Wales

[73] Assignee: Mixalloy Limited, United Kingdom

[21] Appl. No.: 719,492

[22] Filed: Apr. 4, 1985

[30] Foreign Application Priority Data

Apr. 7, 1984 [GB] United Kingdom ............ 8409047

[51] Int. Cl.$^4$ ............................................. C22C 29/12
[52] U.S. Cl. ......................................... 75/232; 75/228; 75/244; 419/3; 419/13; 419/19; 419/32; 419/36; 419/43; 419/47; 419/55; 419/57; 419/58
[58] Field of Search ............... 419/3, 13, 43, 19, 47, 419/32, 36, 55, 57, 58; 75/232, 228, 244

[56] References Cited

U.S. PATENT DOCUMENTS

| | | | |
|---|---|---|---|
| 3,335,000 | 8/1967 | Bliss | 419/43 |
| 3,653,884 | 4/1972 | Davies et al. | 419/43 |
| 3,658,517 | 4/1972 | Davies et al. | 419/43 |
| 3,681,062 | 8/1972 | Jackson | 419/43 |
| 3,796,563 | 3/1974 | Wieland et al. | 419/43 |
| 3,839,026 | 10/1974 | Gibbon et al. | 419/43 |

FOREIGN PATENT DOCUMENTS

| | | |
|---|---|---|
| 1212681 | 11/1970 | United Kingdom. |
| 1257033 | 12/1971 | United Kingdom. |
| 1257032 | 12/1971 | United Kingdom. |
| 1301093 | 12/1972 | United Kingdom. |
| 1341544 | 12/1973 | United Kingdom. |

Primary Examiner—Stephen J. Lechert, Jr.
Attorney, Agent, or Firm—Kinney & Lange

[57] ABSTRACT

A method of producing metallic strip containing discrete particles of one or more additional metallic or non-metallic materials dispersed therein, includes the step of forming a homogeneous mix of ductile metallic particles and a minor proportion of metallic and/or non-metallic particles having chemical and/or physical properties different from those of the ductile metallic particles. A slurry coating comprising a suspension of the mixed particles in a film forming cellulose derivative is deposited onto a moving support surface, dried and removed from the support surface before being subjected to rolling to effect compaction of the ductile content of the strip and sintering at a temperature at which the metallic particles coalesce to form a matrix containing particles of the additional metallic or non-metallic material(s) which either remain as discrete particles or alloy with the matrix.

8 Claims, 1 Drawing Figure

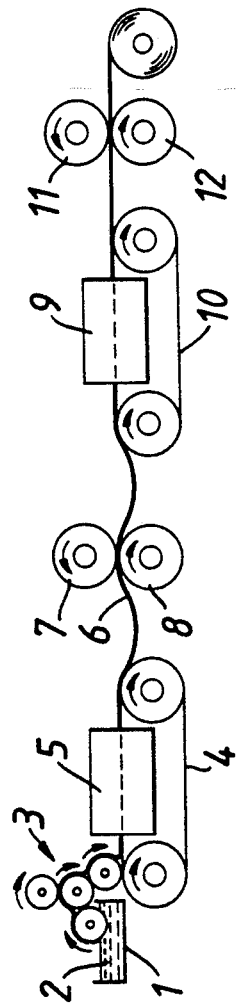

METAL STRIP

This invention relates to the production of metallic strip or sheet (hereinafter referred to simply as "strip") containing discrete particles of one or more additional metallic or non-metallic materials uniformly dispersed in the strip. More particularly, but not exclusively, the invention relates to a method of producing metallic strip for use as a consumable or consumable feedstock, in a weld cladding, welding or brazing process and to strip and consumables produced by this method.

Hitherto, weld cladding, welding and brazing consumables have been produced in the form of alloyed cast rod, in wire form or as a metallic tube enveloping alloying constituents required in the welding process which cannot readily be taken into solution in the quantities required with the metallic material from which the enveloping tube is produced.

The use of cast rods is limited by the composition to be laid down in the welding or brazing process. It will be appreciated that the problems of casting and handling long lengths together with the relativey poor mechanical properties of the cast rod limit their application.

Tubular welding rods or wire suffer from a number of disadvantages, especially when used for cladding large areas.

The present invention sets out to overcome these and other disadvantages.

According to the present invention in one aspect, there is provided a method of producing metallic strip containing discrete particles of one or more additional metallic or non-metallic materials dispersed therein, the method including the steps of forming a homogeneous mix of ductile metallic particles and a minor proportion of metallic and/or non-metallic particles having chemical and/or physical properties different from those of the ductile metallic particles, depositing onto a moving support surface a coating of a slurry comprising a suspension of the mixed particles in a film forming cellulose derivative, drying the coating on the support surface, removing the dried coating in strip form from the support surface, rolling the dried strip to effect compaction of the ductile content of the strip and sintering the compacted strip at a temperature at which the metallic particles coalesce to form a matrix containing particles of the additional metallic or non-metallic material(s) which either remain as discrete particles or alloy with the matrix.

The sintered strip may subsequently be subjected to one or more additional rolling and sintering stages. The strip product may subsequently be slit or shaped to the dimensions required for a welding, weld cladding or brazing process.

The ductile metallic content of the homogeneous mix and the strip produced therefrom may, for example, comprise iron, copper, cobalt or nickel or an alloy including one or more of these elements. The added discrete particles may, for example, comprise synthetic or natural graphite or other forms of carbon including coke, high carbon chrome or ferro chrome; chromium; niobium; molybdemum; tungsten; carbides of metals such as chromium, iron, niobium or tungsten, silicon, boron, and alloys of these materials. Alternatively, the additional metallic or non-metallic material may consist essentially of hard materials such as metal oxides and nitrides, or other hard or ultra-hard materials such as diamond. Other particulate material may also be added.

Strip products manufactured in accordance with the present invention include hard facing alloys for weld cladding application, brazing alloys and strip for specialized welding applications. Such products more especially include iron-based niobium-containing and niobium-free, chromium and carbon containing consumables; cobalt-based hard facing alloy strip consumables of the stellite type; nickel-based hard facing alloy consumables of the Hastelloy type; nickel-based brazing alloy consumables; Nicrobraz LM type alloy consumables; and nickel-based corrosion resistant alloy consumables for special welding applications.

These and further homogenous particulate mixes are detailed and discussed hereinafter with reference to various embodiments exemplary of the invention.

Following compaction and sintering, the strip may be subjected to one or more additional heat treatments and/or reductions to achieve greater density. Also the strip can be slit into widths of 1 mm and upwards.

Suitably, the cellulose derivative is methyl cellulose; in this case an aqueous slurry is deposited onto a moving support which is heated to promote gelling of the methyl cellulose; gelling which occurs at a temperature in excess of about 40° C. conveniently is followed by drying to remove water and produce a self-supporting film or layer referred to as "flexistrip".

The slurry formed from the particulate material and the cellulose may be deposited onto the support surface by any known coating operation, these including roller coating, extrusion, spraying or using a mechanical device such as a doctor blade.

The invention will now be described by way of example with reference to the accompanying diagrammatic drawing in which the sole FIGURE is a schematic illustration of apparatus for producing strip mterial in accordance with the invention.

As illustrated in the drawing, a reservoir 1 contains a slurry 2 of a suspension of particulate material consisting of a homogeneous mix of ductile metallic particles and a minor proportion of metallic and/or non-metallic particles of one or more relatively hard materials in a film forming cellulose derivative. A set of rollers 3 co-operate to deposit a coating of the suspension onto a belt 4 for transport through a drying oven 5. The green strip is self supporting as it issues from the oven 5.

On leaving the oven, the strip is fed through a pair of contra-rotating rollers 7, 8 to effect compaction. The extent of compaction achieved is dependent upon the pressure imposed upon the strip by the rolls. The compacted strip is admitted into the sinter furnace 9 for heat treatment.

The temperature existing in the furnace 9 is such that the ductile metallic content of the strip sinters to form a matrix containing the added particles which, due to the limited heat treatment time are not taken or only partially taken into solution with the metallic particles.

The atmosphere existing within the furnace 9 is normally a reducing atmosphere of, for example, hydrogen and the strip may be carried through the furnace on an endless belt 10. Alternatively, the strip may be supported on a gaseous cushion as it travels through the furnace 9 to minimize stresses occasioned in the strip during sintering. On leaving the furnace 9 the strip may, if required, be subjected to additional rolling and sintering stages to achieve the required physical proportion.

Typically, a density approximating to between 90% and 100% is achieved. In addition, the roll compacted strip may be subjected to additional heat treatments in the furnace 9 or in similar such furnaces.

The invention will now be further described with reference to the following examples exemplary thereof.

EXAMPLE 1

An iron-based niobium-containing strip for use as a hard facing weld cladding consumable, having a composition comprising by weight:

| | |
|---|---|
| Carbon: | 4.5 to 5.5% |
| Niobium: | 6 to 8% |
| Chromium: | 28 to 32% |
| balance iron | | was produced by the following method in accordance with the invention.

The homogeneous mix of ductile and hard particles typically consisted of, by weight:
0.7% synthetic free graphite of particle size <150 μm
7.9% niobium carbide containing 11.38% carbon of particle size in the range 3 to 5 μm;
33.4% high carbon chrome containing 10.1% carbon of particle size <200 μm;
balance iron of particle size <150 μm.

High carbon chrome powder was used because of the difficulty of obtaining chromium carbide powder of the required coarseness. The addition of synthetic free graphite was made to provide the resulting carbon deficiency.

The slurry containing approximately 77% of the homogeneous particulate mix was processed by the method described above the reference to the accompanying drawing, to produce a strip consisting essentially of an iron matrix enclosing the other added particles which provide the required hard facing characteristics. These added particles melt with or dissolve in the ductile matrix during the weld cladding process to produce the required weldment composition.

As an alternative to the use of synthetic graphite, natural graphite, charcoal, coke, iron carbide may be employed. Alternatively, free graphite may be dispensed with entirely, by suitable selection of the constituents.

EXAMPLE 2

For the production of iron-based niobium-free strip consumables having a composition: Carbon 4.5 to 5.5%; Manganese 2% max; Chromium 25 to 30%; Silicon 1% max; balance Iron; the following homogeneous mix was employed.
1.1% synthetic free graphite;
33.4% high carbon chrome containing 10.1% carbon; balance iron.

As for Example 1, the slurry contained approximately 77% of the powder mix excluding additives. The particle size of all powders was less than 200 μm.

The method of producing the strip followed the route given above.

EXAMPLE 3

For the production of cobalt-based hard facing alloy strip consumables of the Stellite type having the following composition by weight was produced:

| | |
|---|---|
| Carbon: | 0.7 to 1.4%; |
| Chromium: | 26 to 32%; |
| Tungsten: | 3 to 6% |
| Silicon: | 2% max; |
| Nickel | 3% max; |
| Iron: | 5% max; |
| Manganese: | 2% max; |
| Molybdenum: | 1% max; |
| Cobalt: | balance apart from incidental impurities. |

A typical homogeneous powder mix using 94/6 Cobalt/Iron as the ductile matrix was as follows:
4.5% tungsten;
7.5% chromium carbide containing 13.5% carbon; 23.5% chromium;
64.5% 94/6 pre-alloyed cobalt/iron.

As for the previous examples, the slurry contained 77% powder (excluding additives). It is anticipated that improved properties might be achieved by replacing the relatively fine chromium carbide (mean particle size of 3 to 5 μm) with coarser high carbon chrome (mean particle size of 120 μm).

Strip was produced from the slurry by the method given above.

EXAMPLE 4

A further typical homogeneous mix again using 94/6 cobalt/iron as the ductile matrix for producing cobalt-based hard facing alloy consumables of the Stellite type was:

| | |
|---|---|
| Chromium: | 19% |
| Chromium carbide: | 9.3% |
| Tungsten: | 5% |
| Silicon: | 0.35% |
| Pre-alloyed 94/6 Cobalt/Iron: | 66.4% |

In this example, the slurry contained 79% powder.

Again, strip was produced from the slurry by the method given above.

EXAMPLE 5

A typical powder mix used for producing hard facing alloy consumables of the Stellite type in which pure cobalt is employed as the ductile matrix was:

| | |
|---|---|
| 2.4% | silicon/manganese; |
| 0.6% | ferro silicon; |
| 14.3% | high carbon ferro chrome; |
| 4.8% | high carbon chromium; |
| 14.6% | chromium; |
| 5% | tungsten; |
| 58.3% | cobalt; |

Generally, the particle size of all powders used was less than 200 μm.

As for the previous examples, strip was produced from a slurry containing the above powder mix by the method described with reference to the drawing.

EXAMPLE 6

For the production of nickel-based hard facing alloy consumables of the Hastelloy type, strip having the following composition was produced:

| | |
|---|---|
| Carbon: | 0.12% max; |

-continued

| | |
|---|---|
| Chromium: | 15.5 to 17.5%; |
| Silicon: | 1% max; |
| Tungsten: | 3.5 to 5%; |
| Iron: | 4.5 to 7%; |
| Manganese | 1% max; |
| Molybdenum: | 16 to 18%; |
| Vanadium: | 0.5% max; |
| Balance Nickel. | |

A homogeneous powder mix in accordance with the present invention consisted of:

| | |
|---|---|
| 16.5% | Chromium; |
| 4.25% | Tungsten; |
| 5.75% | Iron; |
| 17% | Molybdenum; |
| 56.5% | Nickel; |

The particle size of all powders was less than 200 μm.

In this example, the slurry formed contained 76% powder (excluding additives). The method of production followed that given above.

Brazing alloys in strip form in accordance with the present invention are also produced by the method described with reference to the accompanying drawing. As in the case of the welding consumable, the requirement is for a ductile metallic matrix uniformly dispersed hard facing material.

EXAMPLE 7

For the production of nickel based brazing alloy comsumables of the Nicrobaz 135 type, strip having the following composition was produced:

| | |
|---|---|
| 1.9% | Boron; |
| 3.5% | Silicon; |
| 0.06% | Carbon max; |
| | Balance nickel |

A powder formulation used to produce this alloy consisted of:
10.6% Nickel/boron (containing 17.9% boron);
9.26% Nickel/silicon (containing 37.8% silicon);
80.14% Nickel.

The slurry formed contained 77% powder excluding additives, and was processed to strip form by the method described above.

As an alternative to the use of Nickel/silicon, silicon can be added in elemental form to give the following mix composition:

| | |
|---|---|
| 3.5% | elemental silicon; |
| 10.6% | nickel/boron; |
| 85.9% | nickel. |

In this latter example, the slurry contained 77.5% powder of less than 200 μm (excluding additives).

EXAMPLE 8

For the production of Nicrobraz LM type alloy consumables, strip having the following alloy composition was produced:

| | |
|---|---|
| 7% | chromium; |
| 3.1% | boron; |
| 4.5% | silicon; |
| 3% | iron; |
| 0.06% | carbon max; |
| | Balance nickel |

The powder mix composition for the production of the brazing alloy is typically:

| | |
|---|---|
| 17.3% | Nickel/boron (containing 17.9% boron); |
| 7% | Chromium; |
| 4.5% | Silicon; |
| 3.0% | Iron; |
| 68.2% | Nickel; |

In this Example, a slurry containing 78% powder was employed. The slurry was processed to strip form by the method described above.

The ductility of this product can be improved if the alloy is supported by a ductile nickel substrate to which the alloy is bonded. In this case, the nickel content of the alloys is reduced accordingly.

EXAMPLE 9

For the production of nickel-based corrosion resistant alloy consumables for use in special welding application, the final strip product composition is:

| | |
|---|---|
| Carbon: | 0.05% max; |
| Silicon: | 0.2% max; |
| Chromium: | 19 to 21%; |
| Titanium: | 0.5%; |
| Niobium: | 3 to 5% |
| Iron: | 1% max; |
| Manganese: | 2.5 to 3%; |
| Phosphorus and sulphur to be as low as possible; | |
| Balance nickel. | |

The composition of the mixed powders in this example was:

| | |
|---|---|
| 7.69% | Nickel/niobium (containing 52% niobium) |
| 2.08% | Nickel/titanium (containing 24% titanium) |
| 2.8% | Elemental manganese; |
| 20% | Elemental chromium; |
| 67.43% | Nickel; |

In this example, the slurry contained 77.5% powder excluding additives, and was processed to strip from by the method described above.

In each of the foregoing examples, the strip may be subjected to one or more additional rolling and sintering stages. Furthermore, when processing strip material which expands during the first sintering stage, it is advantageous to impose a degree of tension during sintering to offset the expansion.

It is to be understood that the foregoing examples are merely exemplary of the invention and that a wide selection of similar strip products can be produced in accordance with the present invention without departing from the true scope thereof.

We claim:
1. A process for producing metallic strip containing discrete particles of one or more additional metallic or non-metallic materials uniformly dispersed in the strip, the process including the steps of:

forming a slurry of a film forming cellulose derivative containing, in suspension, a quantity of ductile metallic particles and a lesser quantity of other metallic and/or non-metallic particles whose chemical composition and physical properties differ from those of the ductile metallic particles;

mixing the slurry to disperse the ductile metallic particles and other particles uniformly within the cellulose derivative whereby the slurry comprises a substantially homogeneous mix of the ductile metallic particles and the other particles in suspension within the cellulose derivative;

depositing a quantity of this slurry onto a support surface;

heating the slurry to promote gelling of the cellulose derivative to retain the homogeneity achieved in the slurry;

drying the slurry to form a self-supporting flat strip;

removing the dried strip from the support surface;

rolling the dried strip to effect compaction of the ductile content of the strip; and heating the dried self-supporting strip to a temperature at which the ductile metallic particles coalesce to form a matrix containing particles which either remain as discrete particles or are partially taken into solution with the matrix of ductile metal.

2. A process as claimed in claim 1 wherein the ductile metallic content of the particulate homogeneous mix and the strip produced therefrom consists of one of the elements iron, copper, cobalt or nickel, or consists of an alloy including one or more of these elements.

3. A process as claimed in claim 1 wherein the particles of the additional metallic or non-metallic material consists essentially of one or more of the following: synthetic or natural graphite; coke; high carbon chrome or ferro chrome; chromium; niobium; molybdenum; tungsten; carbides of chromium, iron niobium or tungsten; silicon; boron; and alloys of these materials.

4. A process as claimed in claim 1 wherein the particles of the additional metallic or non-metallic material consist essentially of one or more of the following: hard materials including metal oxides and nitrides; other hard or ultra-hard materials.

5. A process as claimed in claim 4 wherein the particular ultra-hard material is diamond.

6. A process as claimed in claim 1 wherein the sintered strip is subjected to one or more additional heat treatments and/or reductions to achieve greater density.

7. A process as claimed in claim 1 wherein the cellulose derivative is methyl cellulose.

8. Metallic strip produced in accordance with a method as claimed in claim 1.

* * * * *